(12) United States Patent
Hayakawa

(10) Patent No.: US 10,659,626 B2
(45) Date of Patent: May 19, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/266,058

(22) Filed: Feb. 2, 2019

(65) Prior Publication Data

US 2019/0174014 A1 Jun. 6, 2019

Related U.S. Application Data

(62) Division of application No. 15/872,711, filed on Jan. 16, 2018, now Pat. No. 10,244,127.

(30) Foreign Application Priority Data

Jan. 31, 2017 (JP) .................................. 2017-015670

(51) Int. Cl.
*H04N 1/00* (2006.01)
*H04N 1/32* (2006.01)
*H04N 1/34* (2006.01)

(52) U.S. Cl.
CPC ..... *H04N 1/00196* (2013.01); *H04N 1/00177* (2013.01); *H04N 1/00251* (2013.01); *H04N 1/32128* (2013.01); *H04N 1/34* (2013.01); *H04N 2201/3215* (2013.01); *H04N 2201/3232* (2013.01); *H04N 2201/3253* (2013.01)

(58) Field of Classification Search
CPC .. H04N 1/00196; H04N 1/34; H04N 1/32128; H04N 1/00251; H04N 1/00177; H04N 2201/3215; H04N 2201/3253; H04N 2201/3232
See application file for complete search history.

(56) References Cited

U.S. PATENT DOCUMENTS

| | | | |
|---|---|---|---|
| 7,362,919 B2* | 4/2008 | Das | G06F 16/54 382/284 |
| 9,406,158 B2 | 8/2016 | Yamaji | G06T 11/60 |
| 9,552,238 B2 | 1/2017 | Hayakawa | G06F 9/542 |
| 9,661,172 B2 | 5/2017 | Hayakawa | H04N 1/00941 |
| 9,883,060 B2 | 1/2018 | Hayakawa | H04N 1/00477 |
| 2005/0140800 A1* | 6/2005 | Jeon | H04N 5/232 348/231.99 |

(Continued)

FOREIGN PATENT DOCUMENTS

| | | |
|---|---|---|
| JP | 2010-072934 | 4/2010 |
| JP | 2015-089112 | 5/2015 |

*Primary Examiner* — Neil R McLean
(74) *Attorney, Agent, or Firm* — Venable LLP

(57) ABSTRACT

An information processing apparatus according to one embodiment of the present invention includes a storage unit configured to store a template group for assigning image data, an acquisition unit configured to acquire identification information of a photographing area in which the image data is photographed inside a facility, and a selection unit configured to select a template with a design corresponding to the identification information of the photographing area inside the facility from the template group stored in the storage unit.

20 Claims, 17 Drawing Sheets

(56) References Cited

U.S. PATENT DOCUMENTS

| | | | |
|---|---|---|---|
| 2006/0053370 A1* | 3/2006 | Hitaka | G11B 27/034 |
| | | | 715/251 |
| 2011/0149343 A1* | 6/2011 | Matoba | G06F 3/1267 |
| | | | 358/1.15 |
| 2012/0151332 A1* | 6/2012 | Kaneko | G06F 3/1208 |
| | | | 715/253 |
| 2012/0275713 A1 | 11/2012 | Yamanakajima | H04N 1/00196 |
| 2014/0205196 A1* | 7/2014 | Freedman | G06T 11/60 |
| | | | 382/217 |
| 2015/0077777 A1 | 3/2015 | Hayakawa | H04N 1/00501 |
| 2016/0055180 A1* | 2/2016 | Nishihara | G06F 16/58 |
| | | | 707/711 |
| 2017/0026528 A1 | 1/2017 | Kim | H04L 67/42 |
| 2017/0187893 A1 | 6/2017 | Hayakawa | H04N 1/00196 |
| 2018/0069974 A1 | 3/2018 | Hayakawa | H04N 1/00472 |
| 2018/0124264 A1 | 5/2018 | Hayakawa | H04N 1/00472 |

\* cited by examiner

| ID | TICKET TAG ID | PHOTOGRAPHING DATE AND TIME | LOCATION ID | IMAGE DATA |
|---|---|---|---|---|
| 000 | 0000-0001-0001-0001 | 2016/12/15 10:00:00 | Entrance | BLOB data |
| 001 | 0000-0001-0001-0001 | 2016/12/15 11:03:00 | Adventure | BLOB data |
| 002 | 0000-0001-0001-0001 | 2016/12/15 11:05:02 | Adventure | BLOB data |
| 003 | 0000-0001-0001-0001 | 2016/12/15 12:01:10 | Rollercoaster | BLOB data |
| 004 | 0000-0001-0001-0001 | 2016/12/15 13:40:20 | Town | BLOB data |
| 005 | 0000-0001-0001-0001 | 2016/12/15 14:02:54 | Town | BLOB data |
| 006 | 0000-0001-0001-0001 | 2016/12/15 15:20:21 | Fantasy | BLOB data |
| 007 | 0000-0001-0001-0001 | 2016/12/15 15:20:24 | Fantasy | BLOB data |
| 008 | 0000-0001-0001-0001 | 2016/12/15 17:00:12 | Quest | BLOB data |
| 009 | 0000-0001-0001-0001 | 2016/12/15 17:30:13 | Quest | BLOB data |
| 010 | 0000-0001-0001-0001 | 2016/12/15 18:14:53 | Entrance | BLOB data |
| 011 | 0000-0002-0002-0002 | 2016/12/15 10:51:42 | Entrance | BLOB data |
| 012 | 0000-0002-0002-0002 | 2016/12/15 12:24:24 | Quest | BLOB data |
| 013 | 0000-0002-0002-0002 | 2016/12/15 13:13:54 | Quest | BLOB data |
| 014 | 0000-0002-0002-0002 | 2016/12/15 15:12:33 | Rollercoaster | BLOB data |
| 015 | 0000-0002-0002-0002 | 2016/12/15 15:56:11 | Rollercoaster | BLOB data |
| 016 | 0000-0002-0002-0002 | 2016/12/15 16:12:35 | Rollercoaster | BLOB data |
| 017 | 0000-0002-0002-0002 | 2016/12/15 16:56:11 | Adventure | BLOB data |
| 018 | 0000-0002-0002-0002 | 2016/12/15 17:12:55 | Quest | BLOB data |
| 019 | 0000-0002-0002-0002 | 2016/12/15 17:12:14 | Quest | BLOB data |

FIG.3

| ID | PHOTOGRAPHING DATE AND TIME | LOCATION ID | IMAGE DATA | SCORE |
|---|---|---|---|---|
| 000 | 2016/12/15 10:00:00 | Entrance | BLOB data | 72 |
| 001 | 2016/12/15 11:03:00 | Adventure | BLOB data | 27 |
| 002 | 2016/12/15 11:05:02 | Adventure | BLOB data | 53 |
| 003 | 2016/12/15 12:01:10 | Rollercoaster | BLOB data | 100 |
| 004 | 2016/12/15 13:40:20 | Town | BLOB data | 62 |
| 005 | 2016/12/15 14:02:54 | Town | BLOB data | 15 |
| 006 | 2016/12/15 15:20:21 | Fantasy | BLOB data | 16 |
| 007 | 2016/12/15 15:20:24 | Fantasy | BLOB data | 70 |
| 008 | 2016/12/15 17:00:12 | Quest | BLOB data | 12 |
| 009 | 2016/12/15 17:30:13 | Quest | BLOB data | 46 |
| 010 | 2016/12/15 18:14:53 | Entrance | BLOB data | 78 |

FIG.6

| TEMPORARY TEMPLATE ID | SLOT POSITION (x) | SLOT POSITION (y) | SLOT WIDTH (w) | SLOT HEIGHT (h) |
|---|---|---|---|---|
| 7100 | 10 | 20 | 80 | 60 |
| 7101 | 20 | 10 | 60 | 80 |
| 7200 | 20 | 10 | 60 | 35 |
|  | 20 | 55 | 60 | 35 |
| 7201 | 10 | 20 | 35 | 60 |
|  | 55 | 20 | 35 | 60 |

(UNIT OF COORDINATE VALUE: mm)

FIG.8

| TEMPLATE ID | SLOT POSITION (x) | SLOT POSITION (y) | SLOT WIDTH (w) | SLOT HEIGHT (h) |
|---|---|---|---|---|
| 9001 | 5 | 5 | 120 | 90 |
| 9002 | 10 | 20 | 80 | 60 |
| 9003 | 110 | 20 | 80 | 60 |

(UNIT OF COORDINATE VALUE: mm)

FIG.10

| TEMPLATE ID | TEMPORARY TEMPLATE ID | LOCATION ID | PERIOD | BACKGROUND IMAGE DATA | DRAWING ORDER |
|---|---|---|---|---|---|
| 9001 | 7100 | Rollercoaster | | R100_1.png | AFTER |
| 9002 | 7100 | FantasyA,FantasyB, FantasyC | | F100_1.png | BEFORE |
| 9003 | 7100 | | | A100_1.png | AFTER |
| 9004 | 7100 | Rollercoaster | 12/1-12/31 | R100_2.png | AFTER |
| 9005 | 7100 | FantasyA,FantasyB, FantasyC | 12/1-12/31 | F100_2.png | AFTER |
| 9006 | 7100 | Rollercoaster | 1/1-3/31 | R100_3.png | BEFORE |
| 9007 | 7100 | FantasyA,FantasyB, FantasyC | 1/1-3/31 | F100_3.png | BEFORE |
| 9008 | 7101 | | | A101_1.png | BEFORE |
| 9009 | 7200 | | | A200_1.png | BEFORE |
| 9010 | 7201 | | | A201_1.png | BEFORE |
| ⋮ | ⋮ | ⋮ | ⋮ | ⋮ | ⋮ |

FIG.11

| ADDITION ORDER | LOCATION ID | ADDING PLACE | IMAGE DATA |
| --- | --- | --- | --- |
| 001 | StockPhoto1 | LAST | BLOB data |
| 002 | StockPhoto2 | LAST | BLOB data |
| 003 | StockPhoto3 | FIRST | BLOB data |
| 004 | StockPhoto4 | MIDDLE | BLOB data |
| 005 | StockPhoto5 | LAST | BLOB data |
| 006 | StockPhoto6 | LAST | BLOB data |
| 007 | StockPhoto7 | LAST | BLOB data |
| 008 | StockPhoto8 | LAST | BLOB data |
| 009 | StockPhoto9 | LAST | BLOB data |

FIG.14

| TEMPLATE ID | TEMPORARY TEMPLATE ID | LOCATION ID | PERIOD | BACKGROUND IMAGE DATA | DRAWING ORDER |
|---|---|---|---|---|---|
| 9001 | 7100 | Rollercoaster | | R100_1.png | BEFORE |
| 9002 | 7100 | FantasyA,FantasyB, FantasyC | | F100_1.png | BEFORE |
| 9003 | 7100 | | | A100_1.png | AFTER |
| 9004 | 7100 | StockPhoto1 | | S100_1.png | AFTER |
| 9005 | 7100 | StockPhoto2 | | S100_2.png | AFTER |
| 9006 | 7100 | StockPhoto3 | | S100_3.png | BEFORE |
| 9007 | 7100 | StockPhoto4 | | S100_4.png | BEFORE |
| 9008 | 7101 | | | A101_1.png | BEFORE |
| 9009 | 7200 | | | A200_1.png | BEFORE |
| 9010 | 7201 | | | A201_1.png | BEFORE |
| ⋮ | ⋮ | ⋮ | ⋮ | ⋮ | ⋮ |

FIG.15

| TEMPLATE ID | TEMPORARY TEMPLATE ID | LOCATION ID | PERIOD | PAGE | BACKGROUND IMAGE DATA | DRAWING ORDER |
|---|---|---|---|---|---|---|
| 17001 | 100 | Entrance | | 1 | E100_1.png | BEFORE |
| 17002 | 100 | Entrance | | 10 | E100_2.png | BEFORE |
| 17003 | 100 | | | | A100_1.png | BEFORE |
| 17004 | 100 | Rollercoaster | 12/1-12/31 | | R100_2.png | BEFORE |
| 17005 | 100 | FantasyA,FantasyB | 12/1-12/31 | | F100_2.png | AFTER |
| 17006 | 100 | Rollercoaster | 1/1-3/31 | | R100_3.png | AFTER |
| 17007 | 100 | FantasyA,FantasyB | 1/1-3/31 | | F100_3.png | AFTER |
| 17008 | 101 | | | | A101_1.png | AFTER |
| 17009 | 200 | | | | A200_1.png | AFTER |
| 17010 | 201 | | | | A201_1.png | AFTER |
| ⋮ | ⋮ | ⋮ | ⋮ | ⋮ | ⋮ | ⋮ |

FIG.17

INFORMATION PROCESSING APPARATUS, INFORMATION PROCESSING METHOD, AND STORAGE MEDIUM

This application is a division of application Ser. No. 15/872,711 filed Jan. 16, 2018, currently pending; and claims priority under 35 U.S.C. § 119 to Japan Application 2017-015670, filed Jan. 31, 2017; and the contents of all of which are incorporated herein by reference as if set forth in full.

BACKGROUND OF THE INVENTION

Field of the Invention

The present invention relates to a technology of laying out image data in a template of a photo album.

Description of the Related Art

Conventionally, a technology for laying out image data in a template on the basis of characteristics of the image data for automatically generating a photo album has been known (see Japanese Patent Laid-Open No. 2010-72934).

In addition, a technology of determining a theme of an image data group and selecting a template on the basis of the determined theme for selecting a template that is appropriate for a theme of a photo album has been known (see Japanese Patent Laid-Open No. 2015-89112).

However, in conventional technologies, a template with a design according to the photographing place or the photographing period of an image cannot be automatically selected although, for image data photographed at a specific photographing place or photographing period, a template design relating to the photographing place or the photographing period is preferable.

Therefore, it was not possible to generate a photo album by automatically selecting a template with a design according to the photographing place or the photographing period of image data.

SUMMARY OF THE INVENTION

An information processing apparatus according to one embodiment of the present invention comprises a storage unit configured to store a template group for assigning image data, an acquisition unit configured to acquire identification information of a photographing area in which the image data is photographed inside a facility, and a selection unit configured to select a template with a design corresponding to the identification information of the photographing area inside the facility from the template group stored in the storage unit.

Further features of the present invention will become apparent from the following description of exemplary embodiments with reference to the attached drawings.

BRIEF DESCRIPTION OF THE DRAWINGS

FIG. 3 is a table diagram of an image database according to Embodiment 1;

FIG. 6 is a table diagram of an image database according to Embodiment 1;

FIG. 8 is a table diagram of temporary template data according to Embodiment 1;

FIG. 10 is a table diagram of template design data according to Embodiment 1;

FIG. 11 is a table diagram of a template design group according to Embodiment 1;

FIG. 14 is a table diagram of stock photo data according to Embodiment 3;

FIG. 15 is a table diagram of template design data according to Embodiment 3;

FIG. 17 is a table diagram of template design data according to Embodiment 4.

DESCRIPTION OF THE EMBODIMENTS

Hereinafter, preferred embodiments of the present invention will be described in detail with reference to the attached drawings. However, the embodiments described below are not for the purpose of limiting the present invention relating to the claims. In addition, not all the combinations of features described in the embodiments are essential to the present invention.

In the embodiments, a case where an image is photographed at a theme park or an amusement park will be described as an example. For example, in a theme park, there are cases where the inside of the park is divided into a plurality of theme areas. In such a case, for image data photographed in a specific theme area, a template design representing the view of the world of the theme area is preferable. Thus, in the embodiments, for example, a technology for selecting a template with a design according to the photographing place or the photographing period of images as a template in which the images photographed in a theme park or an amusement park are laid out will be described.

Embodiment 1

Figure 1:
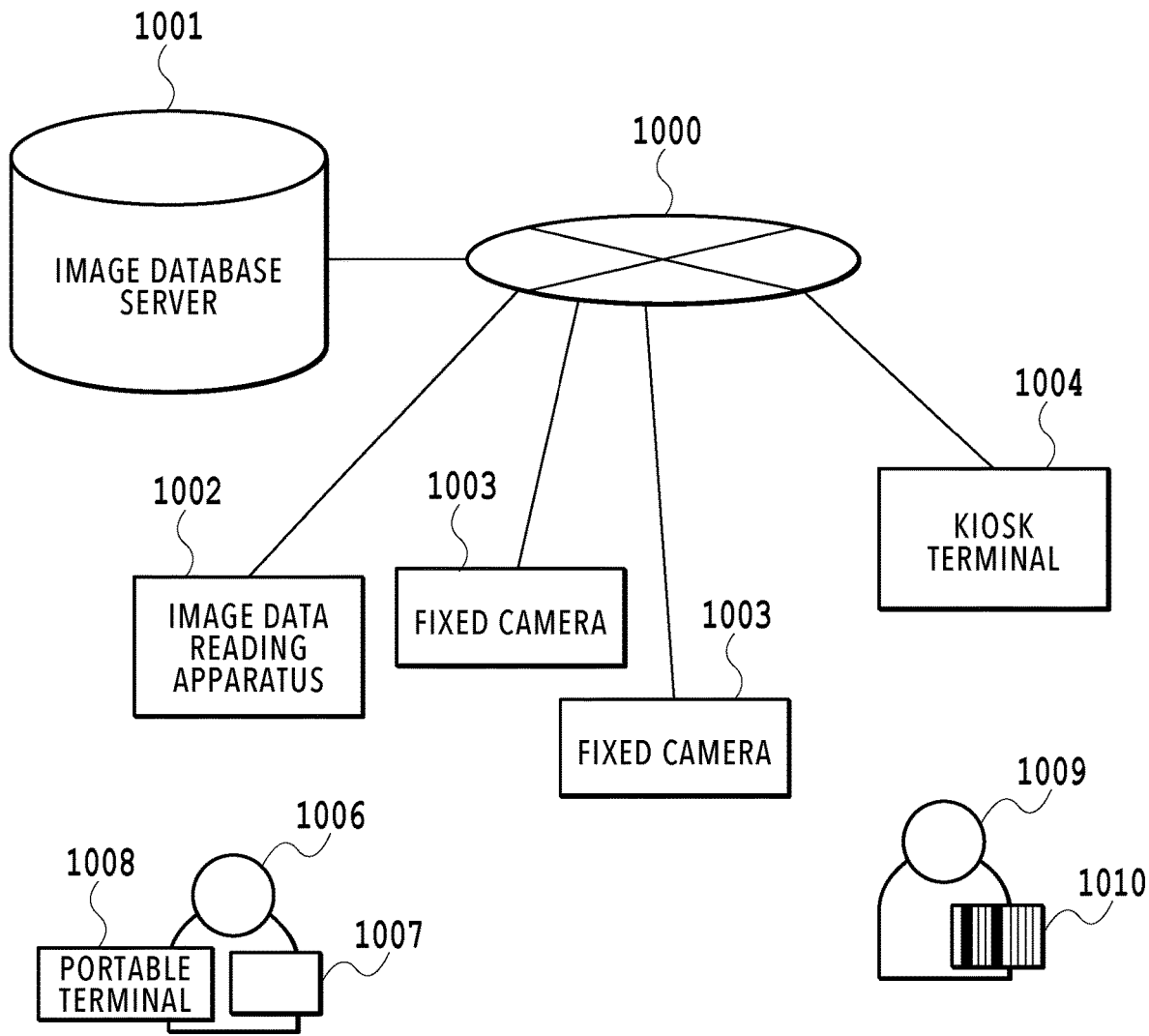
FIG. 1 is a configuration diagram of an inside-park photographing system according to Embodiment 1.

First, an inside-park photographing system according to the present embodiment will be described with reference to FIG. 1. Inside a park, a network 1000 dedicatedly used for the park runs through, and a kiosk terminal 1004, an image database server 1001, a fixed camera 1003, and an image data reading apparatus 1002 are connected to the network 1000. A cameraman 1006 who is a photographer has a camera 1007 and a portable terminal 1008 and performs photographing. The portable terminal 1008 can read a ticket tag ID from a ticket tag 1010 held by a park visitor 1009 and register a location ID of a photographing spot. Here, the location ID is identification information of a photographing area inside a facility such as a theme park, an amusement park, or the like. Image data of a photograph photographed by the cameraman 1006, and a ticket tag ID and a location ID registered in the portable terminal 1008 are transmitted from the image data reading apparatus 1002 to the image database server 1001 through the inside-park network 1000 and is registered in the image database server 1001. The image data reading apparatus 1002 is installed in a staff area inside the park.

A photograph photographed by using the fixed camera 1003 is transmitted to the image database server 1001 through the inside-park network 1000 together with the ticket tag ID of the park visitor 1009, and a unique location ID of the fixed camera 1003 and is registered in the image database server 1001.

The kiosk terminal 1004 can read a ticket tag ID from the ticket tag 1010 held by the park visitor 1009 by using a ticket tag reader comprised in the kiosk terminal. In addition, the kiosk terminal 1004 can receive image data and a location ID associated with the ticket tag ID by inquiring the image database server 1001 by using the read ticket tag ID.

Figure 2:
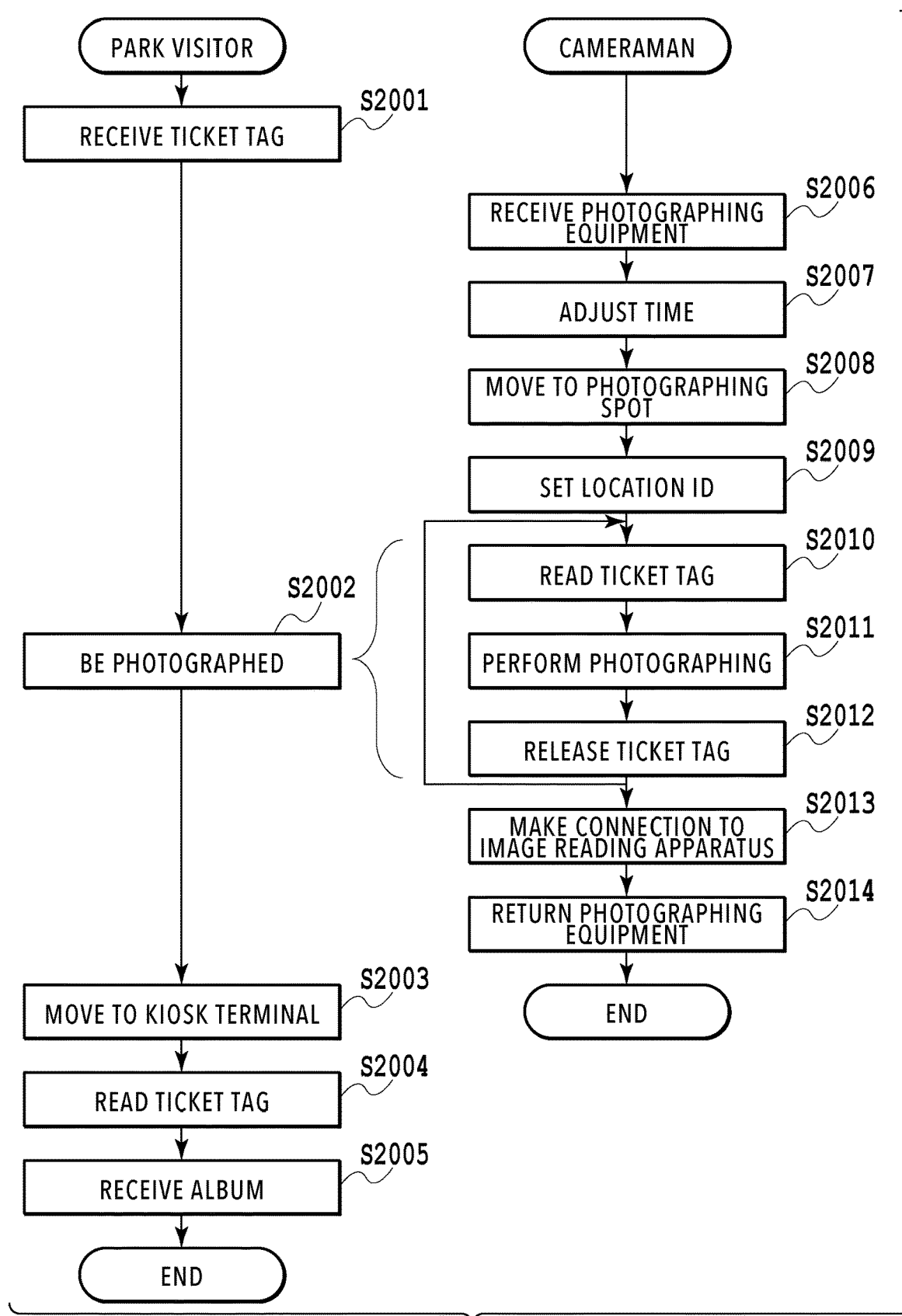
FIG. 2 is a flowchart of an inside-park photographing system according to Embodiment 1.

Next, a flow of receiving an album generated using image data of photographed photographs by using the kiosk terminal 1004 in the inside-park photographing system will be described with reference to FIG. 2.

In Step S2001, when a park visitor 1009 passes through an admission gate, each park visitor receives the ticket tag 1010. In the ticket tag 1010, a ticket tag ID that is unique to each park visitor is recorded by using a two-dimensional bar code, an IC tag, or the like.

In Step S2006, the cameraman 1006 receives the camera 1007 and the portable terminal 1008 that are photographing equipment in an inside-park staff standby place installed inside the park or the like.

In Step S2007, the cameraman 1006 adjusts a built-in clock of the received camera 1007 to a built-in clock of the portable terminal 1008.

In Step S2008, the cameraman 1006 moves to a photographing spot that has been determined. For example, photographing places, photographing time periods, and the like are managed for each cameraman, and the cameraman 1006 performs photographing at a determined place for a determined time period.

In Step S2009, after moving, the cameraman 1006 registers the location ID of the photographing spot after moving in the portable terminal 1008. In this state, the cameraman is in a photographing standby state.

In Step S2002, the park visitor 1009 is photographed by the cameraman 1006. For example, the cameraman 1006 talks to a park visitor 1009 walking inside the park and photographs the park visitor, or a park visitor 1009 asks the cameraman 1006 to photograph him. An operation when the park visitor 1009 becomes a subject will be described in Step S2010 to Step S2012.

In Step S2010, before photographing a park visitor 1009, the cameraman 1006 reads a ticket tag 1010 held by the park visitor 1009 by using the portable terminal 1008. In the portable terminal 1008, the location ID is set in Step S2009, and, a state is formed in which a ticket tag ID read from the ticket tag 1010 is additionally set in this step.

In Step S2011, the cameraman 1006 photographs the park visitor 1009. Since the camera 1007 and the portable terminal 1008 are adjusted in time, with a photograph photographed in this state, a location ID and a ticket tag ID set in the portable terminal 1008 in Step S2007 can be associated from photographing data embedded in photograph data photographed by using the camera 1007. Here, the number of times of photographing is arbitrary. In addition, the cameraman 1006 may read a plurality of ticket tags 1010 by using the portable terminal 1008. For example, in a case where a plurality of park visitors 1009 become subjects, the cameraman 1006 can read ticket tags 1010 of the park visitors 1009 by using the portable terminal 1008 and perform photographing. In this case, a plurality of ticket tag ID are assigned to one photograph.

In Step S2012, after the photographing of the park visitor 1009 ends, the cameraman 1006 releases the ticket tag 1010 by operating the portable terminal 1008 (for example, the ticket tag ID set in the portable terminal 1008 is deleted). In this state, since only the location ID is recorded in the portable terminal 1008, even in a case where photographing is erroneously performed, the ticket tag ID of another park visitor 1009 is not assigned.

In this way, the cameraman 1006, as described in Step S2008, performs photographing in a determined time period, for example, in a period of 10 o'clock a.m. to 3 o'clock p.m. In the camera 1007, image data of the obtained photograph is stored. Next, in Step S2013, the cameraman 1006 moves to the staff area inside the park and connects the camera 1007 and the portable terminal 1008 to the image data reading apparatus 1002. The image data reading apparatus 1002 reads image data from the camera 1007 and reads the location ID of the photographing spot and the ticket tag ID from the portable terminal 1008. Since the built-in clock of the camera 1007 is adjusted to the built-in clock of the portable terminal 1008 in advance, time when photographing is performed using the camera 1007 (in other words, the photographing time of the image data) and the location ID of the photographing spot and the ticket tag ID of the park visitor 1009 registered in the portable terminal 1008 can be uniquely associated with each other. The image data reading apparatus 1002 registers each image data in the image database server 1001 with uniquely being associated with the location ID and the ticket tag ID.

FIG. 3 is a table diagram of the image database server 1001. In the image database server 1001, data received from the image data reading apparatus 1002 is stored. In addition, as illustrated in the drawing, image data and a location ID can be read from the image database server 1001 by using the ticket tag ID as a key. Not only images photographed by the cameraman 1006 but also images photographed by the fixed camera 1003 installed inside the park can be registered in the image database server 1001. The fixed camera 1003 inside the park is set at a specific position of a specific attraction, for example, a rollercoaster and can perceive the facial expression of the park visitor 1009 by automatically pressing a shutter at an exquisite timing at which a ride on which the park visitor 1009 gets passes through. Before getting on the rollercoaster, the park visitor 1009 allows a ticket tag reader installed at a boarding gate to read the ticket tag 1010 and then gets on the rollercoaster. A ticket tag ID read from the ticket tag 1010 is temporarily registered in the image database server 1001 together with the location ID of the rollercoaster. For example, when six persons get on the rollercoaster, six data columns in which image data is vacant are registered in the image database server 1001. After photographing, the fixed camera 1003 transmits the image data to the image database server 1001 through the network 1000. In the image database server 1001, the received image data is registered in the six data columns in which image data is empty.

In Step S2014, the cameraman 1006 returns the camera 1007 and the portable terminal 1008 that are photographing equipment to an inside-park staff standby place installed inside the park or the like.

After being photographed, in Step S2003, in order to generate a photo album by using image data in which the park visitor 1009 is shown, the park visitor 1009 moves to the kiosk terminal 1004.

In Step S2004, the park visitor 1009 allows the ticket tag 1010 to be read by using an input device arranged in the kiosk terminal 1004.

In Step S2005, the park visitor 1009 receives the album generated by the kiosk terminal 1004. The kiosk terminal 1004, as will be described later, can acquire image data from the image database server 1001 based on the ticket tag ID recorded in the ticket tag 1010 and generate an album.

As described above, the park visitor 1009 can receive a photo album using image data photographed by the cameraman 1006 or the fixed camera 1003 inside the park.

The inside-park photographing system described in the present embodiment is merely one example, and photographed image data and a location ID assigned to the photographing spot may be configured to be acquired by the park visitor. For example, in the present embodiment, while the image data of a park visitor is specified by reading the ticket tag ID of the park visitor, the image data of the park visitor may be specified by specifying a person through image processing. In addition, in the present embodiment, while photographing is performed after reading a ticket tag ID, the ticket tag may register a ticket tag ID through radio communication. In other words, according to the communication of a receiver connected to the camera at the time of photographing, a park visitor and image data can be associated with each other. In addition, a location ID may be registered by embedding position information in a radio beacon installed inside the park. In other words, position information from a radio beacon at the time of photographing may be regarded as a location ID. Furthermore, a location ID may be registered using a position information specifying system such as a GPS. In other words, information corresponding to a location ID may be acquired from GPS information at the time of photographing.

Next, the configuration of the kiosk terminal 1004 will be described with reference to FIG. 4.

In the present embodiment, the kiosk terminal 1004 can generate an album (also referred to as a photo album or a photo book) from input image data. In addition, the kiosk terminal 1004 can output the generated album as print data (album data) or upload the generated album to an external server.

The kiosk terminal 1004 includes a read only memory (ROM) 4009, a random access memory (RAM) 4010, and a central processing unit (CPU) 4011. In addition, the kiosk terminal 1004 includes a printer 4005, a monitor 4006, an input device 4007, a storage device 4008, and an input/output interface (not illustrated in the drawing) used for a connection with a network 4003.

The CPU 4011 executes an operating system (hereinafter, abbreviated to an OS) stored in the storage device 4008, the ROM 4009, or the RAM 4010, thereby controlling the overall operation of the kiosk terminal 1004. In addition, the CPU 4011 executes a program stored in the ROM 4009 or the RAM 4010 to realize each function of the kiosk terminal 1004, thereby executing an arithmetic operation and processing of information and control of each hardware. The ROM 4009 stores various programs. The RAM 4010 is a work memory of the CPU 4011 and, in the case of a nonvolatile RAM, stores various programs.

In other words, the kiosk terminal 1004 is an information processing apparatus. In addition, as will be described later, the CPU 4011 executes a program, thereby functioning as an acquisition unit for acquiring photographing place information or photographing period information of image data. Furthermore, the CPU 4011 executes a program, thereby functioning as a selection unit for selecting a template with a design corresponding to the photographing place information or the photographing period information of image data from a template group of an album stored in the kiosk terminal 1004.

The network 4003 is a communication network for connecting the kiosk terminal 1004 and the external server 4002 and transmitting the information thereof. In a case where a printer 4001 used for printing album data is installed inside the park, the network 4003 is the inside-park network 1000 illustrated in FIG. 1. On the other hand, in a case where the printer 4001 is installed outside the park, the network 4003 is a network using a public line or the like.

The external server 4002 includes an input/output interface (not illustrated in the drawing) for a connection with the printer 4001 and is connected to the printer 4001. The album data generated by the kiosk terminal 1004 is uploaded to the external server 4002 through the network 4003. In a case where the uploaded album data is print data that can be printed, the external server 4002 outputs the uploaded album data to the printer 4001. For example, the external server 4002 is an album order managing server, and when the album data generated by the kiosk terminal 1004 is uploaded, and a necessary album purchase order is taken by the park visitor 1009, the external server 4002 prints the album data by using the printer 4001. Thereafter, a printed material is bound as a book by a merchant and reaches the park visitor 1009.

The printer 4005 prints an order form of an order of an album received from the park visitor 1009 using the kiosk terminal 1004 and prints a receipt for performing payment at a counter inside the park or the like. In addition, the printer 4005 may print the album data by using image data that is acquired by the kiosk terminal 1004 from the image database server 1001.

The monitor 4006 is a display device that displays image information output by the kiosk terminal 1004.

The input device 4007 is a keyboard or a pointing device used for performing input for the kiosk terminal 1004 or a ticket tag reader represented by a two-dimensional barcode reader used for reading a ticket tag or the like. In addition, the input device 4007 may be integrated with the monitor to be configured such that the park visitor 1009 performs input by directly being into contact with the monitor 4006.

The storage device 4008 is a storage device such as a hard disk drive (HDD) or a solid state drive (SSD) storing image data, a template of an album, and the like. In other words, the storage device 4008 functions as a storage unit of the kiosk terminal 1004.

Figure 4:
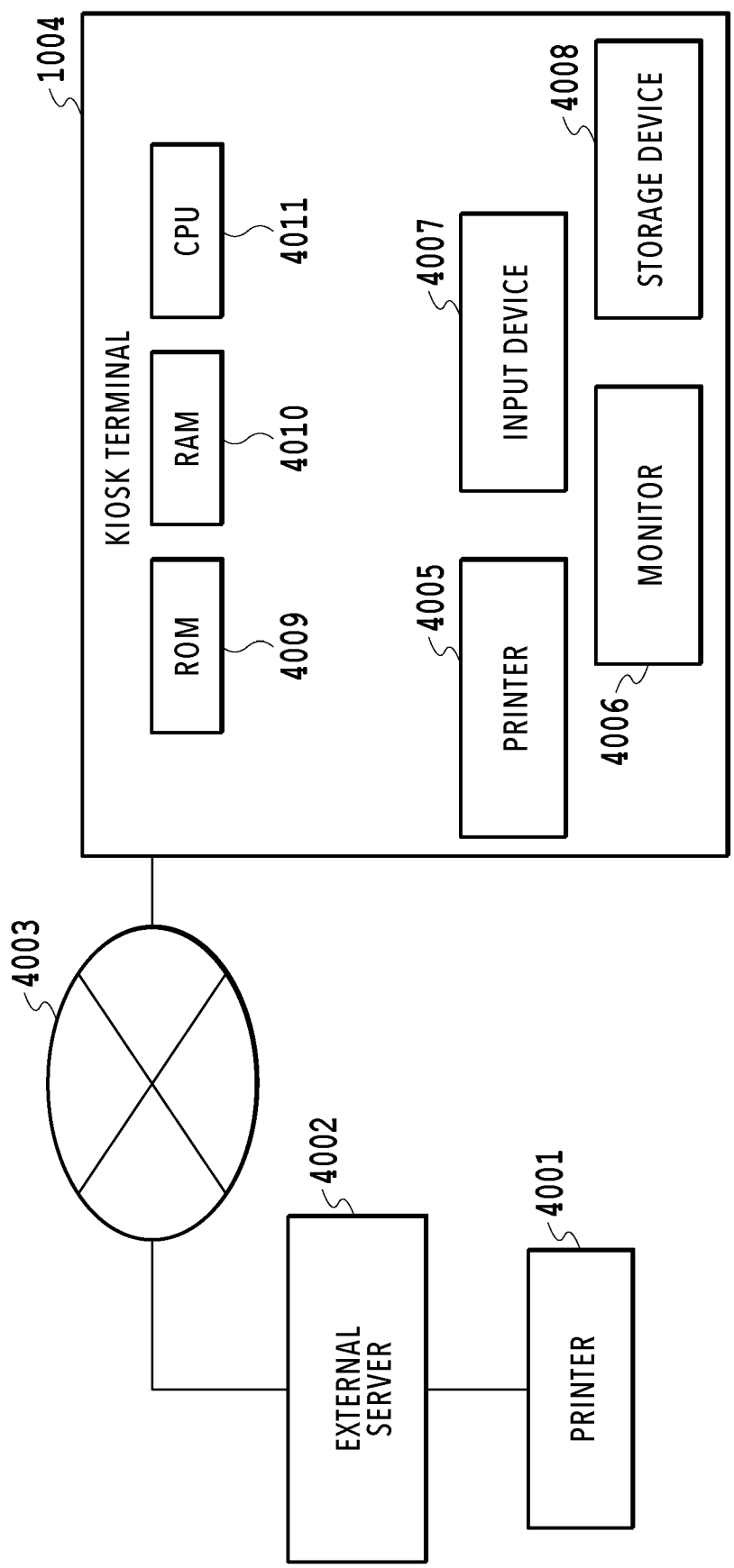
FIG. 4 is a configuration diagram of a kiosk terminal according to Embodiment 1.

In FIG. 4, although the kiosk terminal 1004, the monitor 4006, the input device 4007, and the storage device 4008 are separately illustrated, the kiosk terminal 1004 may be integrated with such devices. In other words, as components of the kiosk terminal 1004, the monitor 4006, the input device 4007, and the storage device 4008 (there are also cases where the storage device is shared by the RAM 4010 of the kiosk terminal 1004) may be included.

Figure 5:
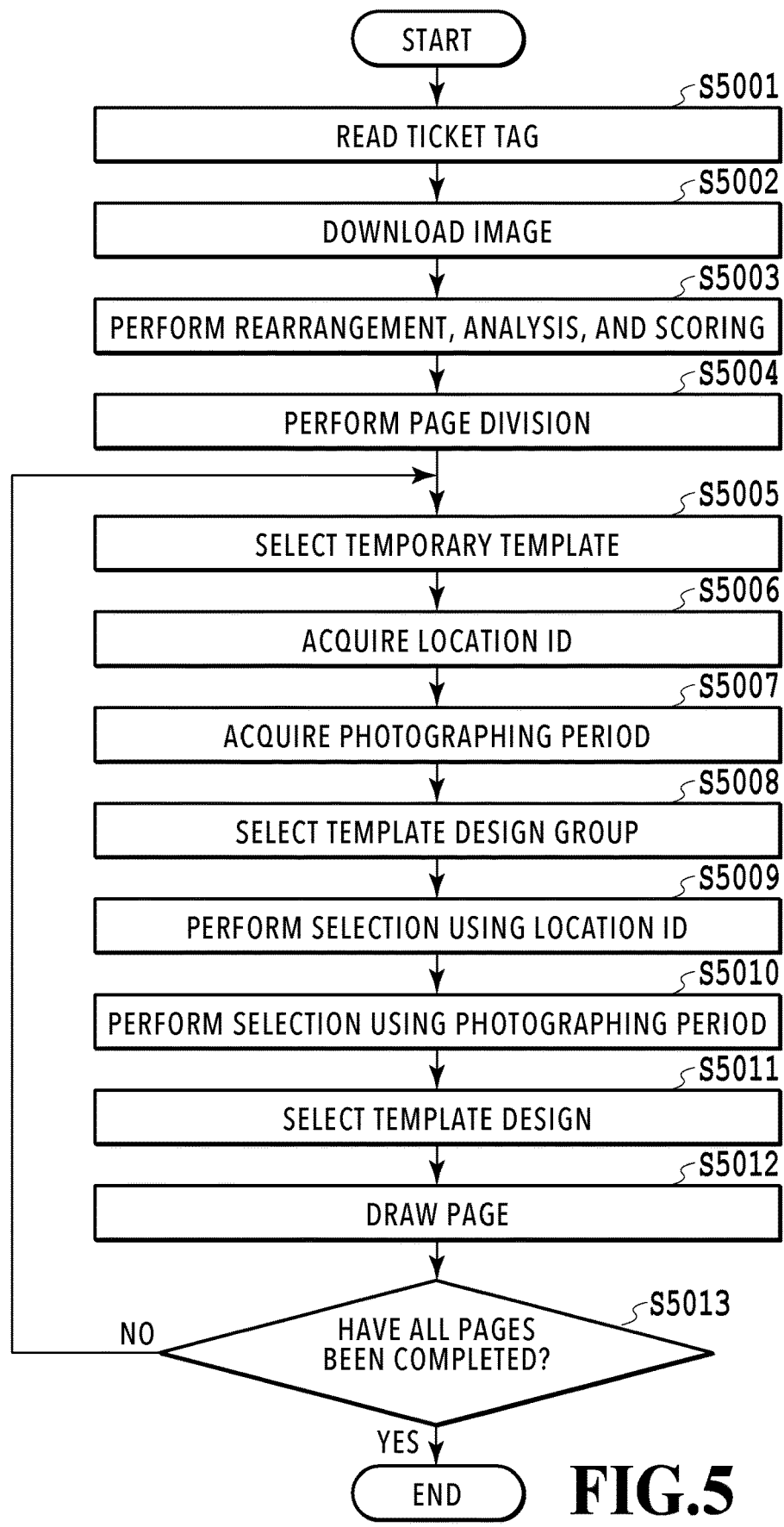
FIG. 5 is a flowchart of a photo album generating process according to Embodiment 1.

FIG. 5 illustrates a flowchart for generating album data using the kiosk terminal 1004. In other words, the flowchart is a flowchart of an information processing method using the kiosk terminal 1004 that is an information processing apparatus. The CPU 4011 of the kiosk terminal 1004 executes a program, thereby functioning as a unit for executing each step of the flowchart. This applies also to a flowchart of the process of the kiosk terminal 1004 to be described later.

In Step S5001, the park visitor 1009 allows the kiosk terminal 1004 to read the ticket tag 1010. The kiosk terminal 1004 reads a ticket tag ID recorded in the ticket tag 1010 by using the input device 4007.

In Step S5002, the kiosk terminal 1004 inquires of the image database server 1001 about image data and a location ID based on the ticket tag ID read in Step S5001. In a case where image data and a location ID associated with the ticket tag ID are present, the image data and the location ID are downloaded through the inside-park network 1000 and are stored in the storage device 4008 provided inside the kiosk terminal 1004. For example, in a case where the ticket tag ID is "0000-0001-0001-0001", the photographing date and time, the location ID, and the image data of each of ID 000 to ID 010 can be acquired from the image database illustrated in FIG. 3.

In addition, in a case where the park visitor 1009 visits the park together with his family member or the like, the kiosk terminal 1004 may be caused to read a plurality of ticket tag IDs, and the above-described data associated with each ticket tag ID may be downloaded. In such a case, the process of Step S5001 and Step S5002 is repeated.

In Step S5003, the kiosk terminal 1004 performs rearrangement, an analysis, and scoring of the image data group downloaded in Step S5002. In this step, the kiosk terminal 1004, first, rearranges the image data group in a time series by sorting the image data group in accordance with the photographing date and time inside the park. Thereafter, the kiosk terminal 1004 performs scoring by analyzing images. FIG. 6 illustrates an example of a scoring result of the image data group downloaded in Step S5002. The scoring is performed in accordance with an independent criterion by using a face detection result, a histogram of images, and a frequency analysis. Then, the kiosk terminal 1004 weights scores of the analysis results, adds resultant scores, and acquires and stores a comprehensive score (total score) of each image data.

In Step S5004, the kiosk terminal 1004 divides the image data group downloaded in Step S5002 into pages based on the photographing date and time. Here, the page division is a process of dividing the downloaded image data group so as to be assigned to each page of an album. For example, there are a method of uniformly assigning image data to each page, a method of performing clustering using the photographing dates and times of images and assigning each cluster to each page, and the like. The number of pages of an album may be designated when a ticket tag is allowed to be read in Step S5001 by the park visitor 1009 or be the number of pages determined in advance.

In addition, until this step, the process is for all the downloaded image data, and from the next step, the process is for each page.

Figure 7:
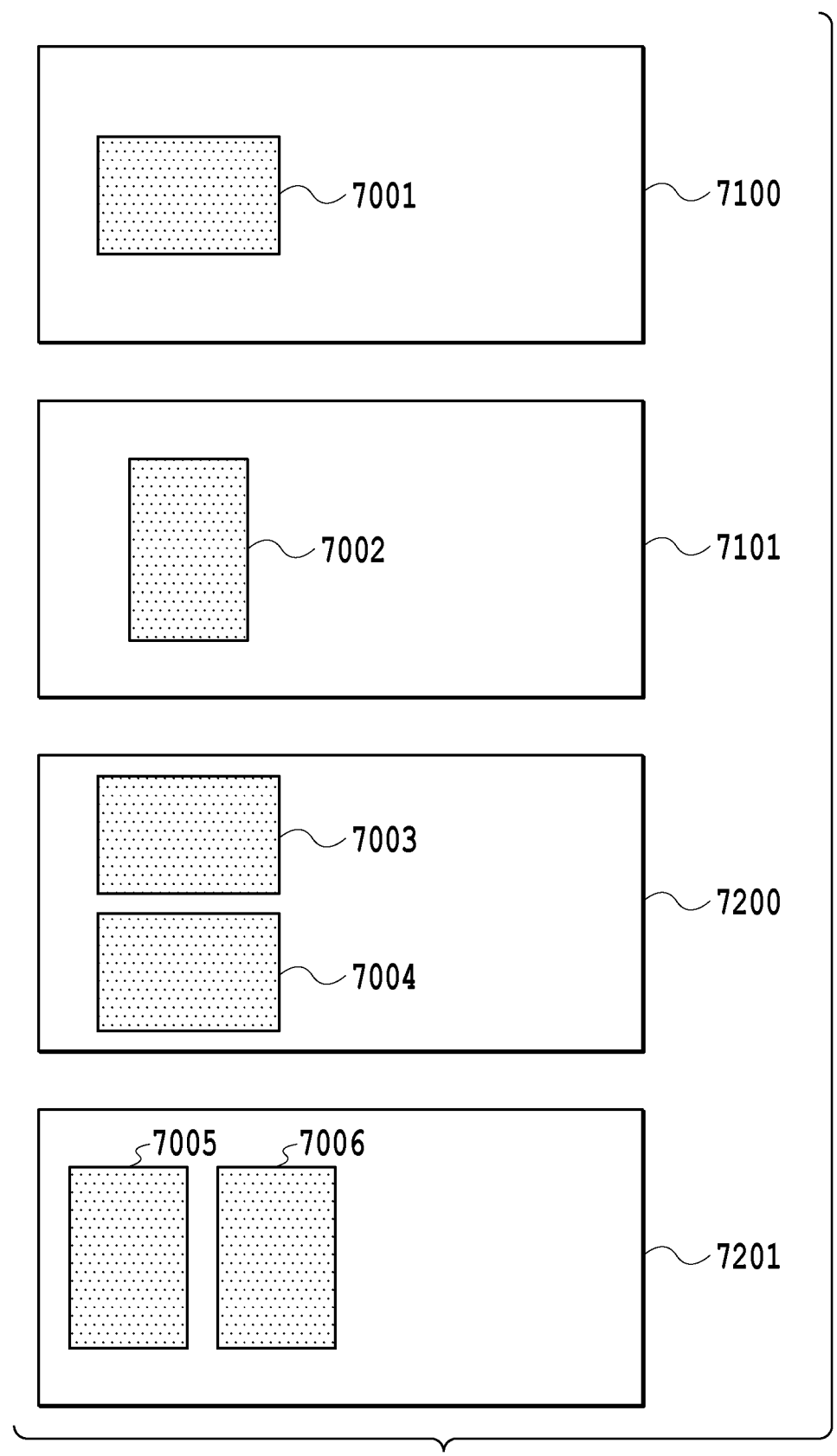
FIG. 7 is a diagram illustrating a temporary template according to Embodiment 1.

In Step S5005, the kiosk terminal 1004 selects one temporary template for a page that is a processing target from a temporary template group illustrated in FIGS. 7 and 8. FIG. 8 illustrates a database in which coordinates values (an x coordinate and a y coordinate) and dimension values (a width w and a height h) of an image slot used for assigning image data are stored for each temporary template. The coordinate values x and y represent coordinate values of the upper left side of the image slot, the dimension value w represents the width of the image slot, and the dimension value h represents the height of the image slot. FIG. 7 illustrates the positions of image slots 7001 to 7006 in temporary templates 7100, 7101, 7200, and 7201. In this step, the kiosk terminal 1004, first, extracts two pieces of image data of which total scores are highest two scored from among the scored image data. Next, the kiosk terminal 1004 extracts temporary templates 7200 and 7201 each having two image slots from a temporary template group. Next, the kiosk terminal 1004 arranges images in a time series order for a plurality of extracted temporary templates. Next, the kiosk terminal 1004 acquires score values of the arranged images using trimming amounts. Next, the kiosk terminal 1004 selects a temporary template having a minimal score value. In other words, the temporary template ID of one temporary template selected from among the temporary template group is acquired.

In Step S5006, the kiosk terminal 1004 acquires a location ID of each image in the temporary template selected in Step S5005. In this process, the kiosk terminal 1004 determines a location ID representing photographing place information that represents a place at which image data of the temporary template is photographed. Here, a location ID is identification information of a photographing area inside a facility such as a theme park, an amusement park, or the like. In a case where a plurality of images are present, and all thereof have a same location ID, the kiosk terminal 1004 sets this location ID as a location ID of the page. In a case where a plurality of image are present, and different location IDs are present, the kiosk terminal 1004 checks whether a special location ID is present among the location IDs. Here, a special location ID represents an area in which an attraction or a feature that is popular inside the park is present. When an image having such a location ID and an image having a location ID not relating thereto are laid out in a same page, the non-related image is distractive in a background having a feature and looks unattractive. For this reason, in a case where a special location ID is present, the kiosk terminal 1004 leaves only an image having the location ID and deletes images having the other location IDs from the page. In a case where an image is deleted, the number of image slots changes, and accordingly, the kiosk terminal 1004 changes the template to an appropriate template. In the present embodiment, since a maximum number of image slots is two, in a case where an image is deleted, the kiosk terminal 1004 changes the template to a template having one image slot. At this time, the kiosk terminal 1004 selects a template having a small trimming amount based on the aspect ratio of the remaining image. Described in short, the kiosk terminal 1004 selects a temporary template ID: 7100 in a case where a horizontally-long image is left and selects a temporary template ID: 7101 in a case where a vertically-long image is left. In a case where the number of image slots is large, there are cases where the template cannot be simply changed. For this reason, a table used for determining a template to be switched to in a case where a certain image of the template is deleted may be prepared in advance, and the kiosk terminal 1004 may determine a template to be switched to based on the deleted image.

In Step S5007, the kiosk terminal 1004 acquires a photographing period of images of the temporary template selected in Step S5005. In other words, the kiosk terminal 1004 acquires an oldest photographing date and a latest photographing date in the image group, sets a period from the oldest photographing date to the latest photographing date as a photographing period, and stores the photographing period as photographing period information.

In Step S5008, the kiosk terminal 1004 selects a template design group based on the template ID of the temporary template acquired in Step S5005. In the kiosk terminal 1004, the database of the template design group illustrated in FIG.

11 is stored, and a plurality of template designs corresponding to each temporary template ID are stored. In this step, first, a template group corresponding to a temporary template ID is selected. Hereinafter, the template design will be described in detail.

Figure 9:
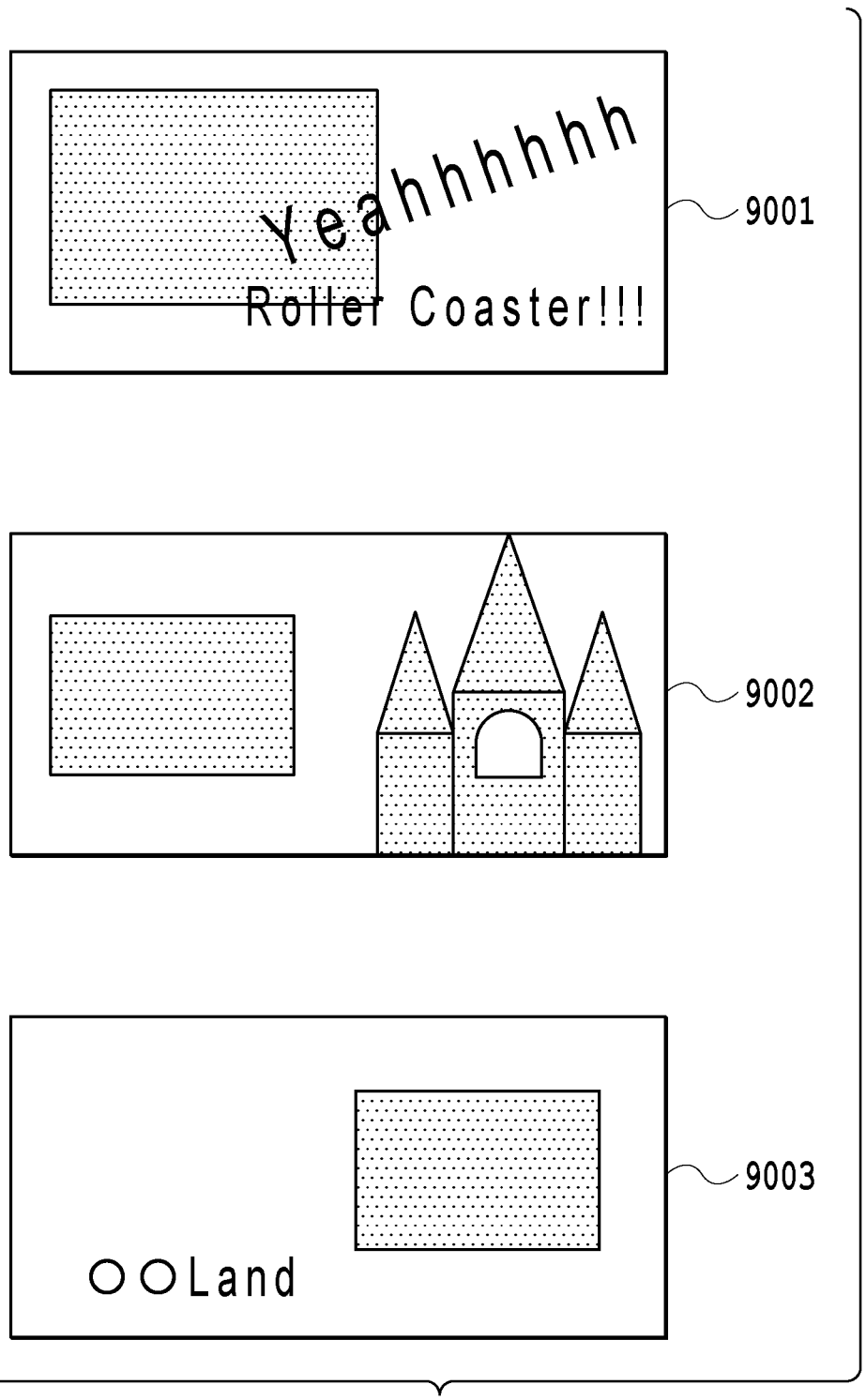
FIG. 9 is a layout diagram of a template design according to Embodiment 1.

FIG. 9 illustrates examples of template designs, and template designs 9001, 9002, and 9003 are illustrated as examples. FIG. 10 illustrates coordinate values of an image slot of each template design illustrated in FIG. 9. In FIG. 10, coordinate values x and y represent coordinate values of the upper left side of an image slot, a dimension value w represents the width of the image slot, and the dimension value h represents the height of the image slot.

For example, referring to FIG. 11, the template design 9001 has a temporary template ID of 7100 and a location ID of Rollercoaster. When the coordinate values of the image slot illustrated in FIG. 10 are compared with the coordinate values of the image slot illustrated in FIG. 8, although the sizes of the image slots are different, the aspect ratios match each other. The image slot 7001 included in the temporary template 7100 illustrated in FIG. 8 has a width (w) of 80 and a height (h) of 60, and accordingly, the aspect ratio is about 1.33. Meanwhile, the image slot included in the template design 9001 illustrated in FIG. 9 has a width (w) of 120 and a height (h) of 90, and accordingly, the aspect ratio is about 1.33. Similarly, the image slots included in the template design 9002 and the template design 9003 have widths (w) of 80 and heights (h) of 60, the aspect ratios thereof are about 1.33, and thus, the aspect ratios match each other. The reason for this is that, when one image is selected, and the template design 9001 is used, the width (w) and the height (h) of the image slot is set to be larger than the dimensions designated in the temporary template, and the image is enlarged to have dynamic composition. Such a template design is, for example, a template design having a specific attraction as its background and is a template design generated on the premise of an image in the middle of an experience of the specific attraction.

Referring to FIG. 11, the template design 9002 has a temporary template ID of 7100 and location IDs corresponding to a plurality of location IDs of FantasyA, FantasyB, and FantasyC. This means that such a template design is, for example, a template design having a specific theme area inside the park as its background and is a matching template design without incurring any sense of incongruity as long as photographing is performed at any place inside a specific area.

Also, referring to FIG. 11, the template design 9003 has a temporary template ID of 7100 and has no location ID assigned thereto (hereinafter, referred to as "Any location ID"). In addition, the position (x, y) of the image slot included in the template design 9003 is different from the position (x, y) of the image slot included in the temporary template 7100 illustrated in FIG. 8. The reason for this is that, when one image is selected, and the template design is used, a significant illustration and the like are designed on the left side in the page. Such a template design is, for example, a template design having an overall atmosphere of the inside of the park as its background. Alternatively, such a template design is a template design that can be assigned to a location ID for which a specific template design is not prepared or a template design of a page in which a plurality of mutually-different specific theme areas are mixed.

In Step S5009, the kiosk terminal 1004 further selects a template design group matching the location ID acquired in Step S5006 from the template design group selected in Step S5008. In a case where the number of the location ID is one, a template design group in which the location ID is included is simply selected. For example, in a case where the location ID is "Rollercoaster", the template designs 9001, 9004, and 9006 illustrated in FIG. 11 are selected. As illustrated in the drawing, different photographing periods are designated for such template designs in the Rollercoaster that is the same photographing area. In a case where there are a plurality of location IDs, a template design group in which all the location IDs are included is selected. For example, in a case where the location IDs are FantasyA and FantasyC, the template designs 9002, 9005, and 9007 illustrated in FIG. 11 are selected. In addition, in a case where any one template design is not selected, the background image disappears, and accordingly, the template of "Any location ID" having no sense of incongruity for any location ID is selected. For example, in a case where the location ID is "Town", there is no template design having the location ID of "Town" illustrated in FIG. 11, and accordingly, the template design 9003 of "Any location ID" is selected. In this step, since all the template designs matching the location ID are selected, there is a possibility that a plurality of template designs are selected.

In Step S5010, the kiosk terminal 1004 selects a template design group matching the photographing period information acquired in Step S5007 from the template design group selected in Step S5009. For example, in Step S5009, template designs 9001, 9004, and 9006 of which the location IDs are Rollercoaster are assumed to be selected. In a case where the photographing period is December 13, the template design 9004 matching the photographing period is selected. In addition, in a case where the photographing period is November 1, there is no template design matching the photographing period in the template design group in which a photographing period is set, and accordingly, the template design 9001 in which a photographing period is not set is selected.

In Step S5011, the kiosk terminal 1004 selects one template design from among the template design group selected in Step S5010. In a case where one template design is selected in Step S5010, the template design is selected. On the other hand, in a case where a plurality of template designs are selected in Step S5010, since information determining the superiority of the template design is not present, one template design is randomly selected from among template designs that do not appear in the previous page. In other words, the kiosk terminal 1004, first, excludes a template design that has been laid out. In addition, in a case where all the template designs are used, there is no template design to be selected, and accordingly, the kiosk terminal 1004 excludes only a template design that has been laid out in the previous page. Then, one is randomly selected from among the remaining template designs. As above, the template design is determined.

In Step S5012, the kiosk terminal 1004 draws an album page based on the image data of the temporary template selected in Step S5005 and the template design determined in Step S5011. In this drawing process, in a column of a drawing order illustrated in FIG. 11, designation of whether the image data is drawn after drawing the template design or the template design is drawn after drawing the image data is defined.

Generally, after the template design is drawn, an image is drawn. In addition, in a case where a design other than a rectangle such as a design in which a part of a character overlaps the image is used, the position of the image of the template design may be designated to be in a transparent color. In such a case, the image is drawn first, and then the template design in which the designation of the transparent color is present is drawn from the upper side, whereby a design other than a rectangle can be represented.

In Step S5013, the kiosk terminal 1004 determines whether or not the process of all the pages has been completed. In a case where the process of all the pages has not been completed, the process is returned to Step S5005, and the next page is processed. On the other hand, in a case where the process has been completed, the process ends. In other words, by repeating Step S5005 to Step S5012 in correspondence with the number of pages, the album data corresponding to all the pages can be generated.

As described above, according to the present embodiment, an album can be generated by assigning a template design corresponding to the photographing place and the photographing period of the image data by using a location ID associated with the image data and the photographing period of the image data. In addition, a configuration in which a template design is assigned using any one of the location ID or the photographing period may be employed, and this applies also to embodiments described below.

Embodiment 2

While in Embodiment 1 a template design is selected using a temporary template, in the present embodiment, a template design is directly selected without using a temporary template. The configurations of an inside-park photographing system and a kiosk terminal 1004 are the same as those of Embodiment 1, and thus, the description thereof will not be presented here.

Figure 12:
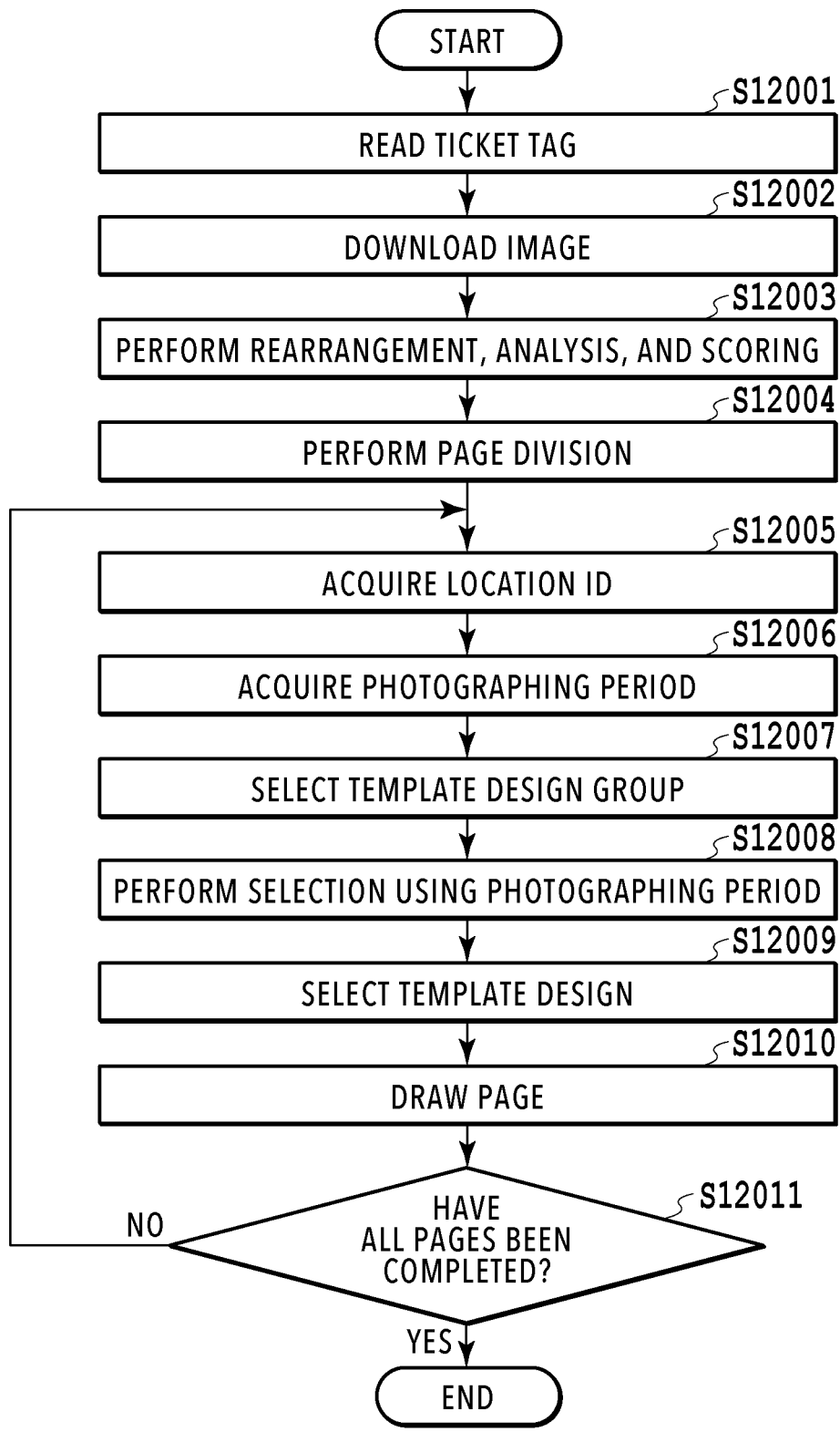
FIG. 12 is a flowchart of a photo album generating process according to Embodiment 2.

FIG. 12 illustrates a flowchart for generating album data using the kiosk terminal 1004.

In Step S12001, the park visitor 1009 allows the kiosk terminal 1004 to read a ticket tag 1010. The kiosk terminal 1004 reads a ticket tag ID recorded in the ticket tag 1010 by using a ticket tag reader.

In Step S12002, the kiosk terminal 1004 inquires of the image database server 1001 about image data and a location ID based on the ticket tag ID read in Step S12001. In a case where image data and a location ID associated with the ticket tag ID are present, the kiosk terminal 1004 downloads the image data and the location ID through an inside-park network 1000 and stores them in a storage device 4008 provided inside the kiosk terminal 1004. For example, in a case where the ticket tag ID is "0000-0001-0001-0001", the kiosk terminal 1004 can acquire the photographing date and time, the location ID, and the image data of each of ID 000 to ID 010 from an image database illustrated in FIG. 3.

In addition, in a case where the park visitor 1009 visits the park together with his family member or the like, the kiosk terminal 1004 may be caused to read a plurality of ticket tag IDs, and the above-described data associated with each ticket tag ID may be downloaded. In such a case, the process of Step S12001 and Step S12002 is repeated.

In Step S12003, the kiosk terminal 1004 performs rearrangement, an analysis, and scoring of the image data group downloaded in Step S12002. In this step, the kiosk terminal 1004, first, rearranges the image data group in a time series by sorting the image data group in accordance with the photographing date and time inside the park. Thereafter, the kiosk terminal 1004 performs scoring by analyzing images. The scoring process is the same as the process of Step S5003 according to Embodiment 1, and thus, the description thereof will not be presented here.

In Step S12004, the kiosk terminal 1004 divides the image data group downloaded in Step S12002 into pages based on the photographing date and time. The process of this step is the same as the process of Step S5004 according to Embodiment 1, and thus, the description thereof will not be presented here.

In addition, until this step, the process is for all the downloaded image data, and from the next step, the process is for each page.

In Step S12005, the kiosk terminal 1004 acquires location IDs of divided image data for a page that is a processing target. In the present embodiment, since a temporary template is not used, the kiosk terminal 1004 acquires a location ID group from images having possibilities of being laid out in the page. Then, the kiosk terminal 1004 acquires a plurality of location ID groups with a combination of a plurality of images considered. For example, the kiosk terminal 1004 determines location IDs using five high-ranking images in order of highest to lowest score acquired in Step S12003. In a case where all the location IDs of the five high-ranking images coincide with each other, the location ID is set as a location ID of a selected image. On the other hand, in a case where the location IDs of the high-ranking five images are different, the kiosk terminal 1004 acquires a location ID group of high-ranking four images, a location ID group of high-ranking three images, a location ID group of high-ranking two images, and the location ID of the high-ranking one image. In addition, the location ID group is arranged such that duplicate IDs are not present. For example, in a case where all the location IDs included in the location ID group of the high-ranking five location ID group are the same, one location ID is selected. Here, although the kiosk terminal 1004 selects five images of high rankers in the score, the number of images to be selected is not limited to five. Next, the kiosk terminal 1004 checks whether a special location ID is included in the acquire location ID group. In a case where the special location ID is included, the kiosk terminal 1004 generates a location ID group in which IDs other than the special location ID are deleted. According to such a process, the kiosk terminal 1004 can acquire a plurality of location ID groups.

In Step S12006, the kiosk terminal 1004 acquires a photographing period of image data divided into pages. In other words, in the page-divided image group, an oldest photographing date and a latest photographing date are acquired, and a period from the oldest photographing date to the latest photographing date is set as a photographing period. At this time point, a plurality of page-divided candidate images are present, and not all thereof are used. Since a period for strolling inside the park is short, even in a case where a photographing period is acquired from all the images, a period equivalent to that acquired from an image that is finally laid out can be acquired.

In Step S12007, the kiosk terminal 1004 selects a template design group based on the plurality of location ID groups acquired in Step S12005. In other words, the kiosk terminal 1004 selects a template design group for each individual location ID group and acquires a template design group selected from all the location ID groups. In a case where the same template design is acquired from mutually-different location ID groups, the kiosk terminal 1004 deletes a duplicate template design to select a template design group having no duplication. In a case where one location ID is included in the location ID group, a template design group included in the location ID is simply selected. On the other hand, in a case where a plurality of location IDs are included in the location ID group, a template design group including all the plurality of location IDs is selected.

Here, in a case where any one template design group is not selected, the background image disappears, and accordingly, the template design of "Any location ID" having no sense of incongruity for any location ID is selected. In this step, a template design group is selected based on the plurality of location ID groups.

In Step S12008, the kiosk terminal 1004 selects a template design group matching the photographing period acquired in Step S12006 from the template design group selected in Step S12007.

In Step S12009, the kiosk terminal 1004 selects one template design from among the template design group selected in Step S12008. When the process proceeds to this step, a state is formed in which an image group and a template design group to be laid out in the page are selected. In this step, the kiosk terminal 1004, first, extracts high-ranking two scored images. The kiosk terminal 1004 extracts template designs each having two image slots from the template design group. Next, the kiosk terminal 1004 arranges images in a time series order for a plurality of the extracted template designs. Next, the kiosk terminal 1004, for each of the arranged images, acquires a score value using a trimming amount and a score value based on the degree of similarity from the location ID of the template design and the location ID of the image. Next, the kiosk terminal 1004 performs weighted addition of the two score values and selects a template design of which the score value is minimal. In a case where template designs having the same score value acquired by performing weighted addition are present, since information determining the superiority of the template design is not present, the kiosk terminal 1004 randomly selects one template design from among template designs that do not appear in the previous page. In other words, the kiosk terminal 1004, first, excludes a template design that has been laid out. In addition, in a case where all the template designs are used, there is no template design to be selected, and accordingly, the kiosk terminal 1004 excludes only a template design that has been laid out in the previous page. Then, the kiosk terminal 1004 randomly selects one from among the remaining template designs. As above, the template design is determined.

In Step S12010, the kiosk terminal 1004 draws an album page based on the template design selected in Step S12009. In this drawing process, in a column of a drawing order illustrated in FIG. 11, designation of whether the image data is drawn after drawing the template design or the template design is drawn after drawing the image data is defined.

Generally, after the template design is drawn, an image is drawn. In addition, in a case where a design other than a rectangle such as a design in which a part of a character overlaps the image is used, the position of the image of the template design may be designated to be in a transparent color. In such a case, the image is drawn first, and then the template design in which the designation of the transparent color is present is drawn from the upper side, whereby a design other than a rectangle can be represented.

In Step S12011, the kiosk terminal 1004 determines whether or not the process of all the pages has been completed. In a case where the process of all the pages has not been completed, the process is returned to Step S12005, and the next page is processed. On the other hand, in a case where the process has been completed, the process ends. In other words, by repeating Step S12005 to Step S12010 in correspondence with the number of pages, the album data corresponding to all the pages can be generated.

As described above, according to the present embodiment, an album can be generated by assigning a template design by directly using a location ID associated with the image data and the photographing period of the image data without using a temporary template.

Embodiment 3

In Embodiment 1, the process has been advanced on the premise that the number of images is sufficient for the generation of a photo album. On the other hand, in a case where the number of images photographed inside the park does not reach the number of pages of an album, it is necessary to reuse a same image or separately generate a special page. The method according to Embodiment 1 can also handle a case where the same image is reused, and images corresponding to a necessary number may be prepared by copying image data downloaded in Step S5002. In the present embodiment, a case where a special page is separately generated will be described. The configurations of an inside-park photographing system and a kiosk terminal 1004 are the same as those of Embodiment 1, and thus, the description thereof will not be presented here.

Figure 13:
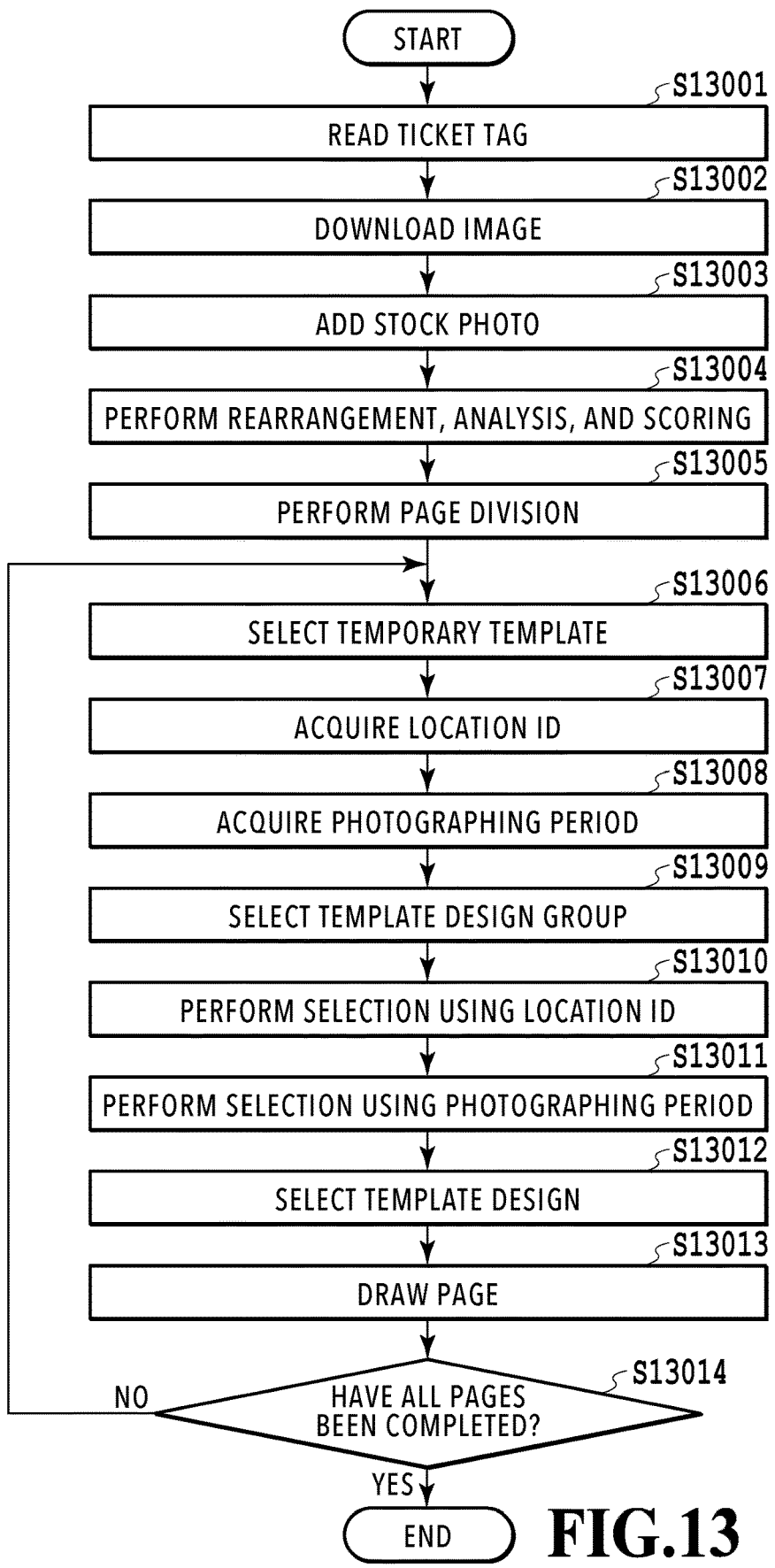
FIG. 13 is a flowchart of a photo album generating process according to Embodiment 3.

FIG. 13 illustrates a flowchart for generating album data using the kiosk terminal 1004.

In Step S13001, the park visitor 1009 allows the kiosk terminal 1004 to read a ticket tag 1010. The kiosk terminal 1004 reads a ticket tag ID recorded in the ticket tag 1010 by using a ticket tag reader.

In Step S13002, the kiosk terminal 1004 inquires of the image database server 1001 about image data and a location ID based on the ticket tag ID read in Step S13001. In a case where image data and a location ID associated with the ticket tag ID are present, the kiosk terminal 1004 downloads the image data and the location ID through an inside-park network 1000 and stores them in a storage device 4008 provided inside the kiosk terminal 1004. For example, in a case where the ticket tag ID is "0000-0001-0001-0001", the kiosk terminal 1004 can acquire the photographing date and time, the location ID, and the image data of each of ID 000 to ID 010 from an image database illustrated in FIG. 3.

In addition, in a case where the park visitor 1009 visits the park together with his family member or the like, the kiosk terminal 1004 may be caused to read a plurality of ticket tag IDs, and the above-described data associated with each ticket tag ID may be downloaded. In such a case, the process of Step S13001 and Step S13002 is repeated.

For the description of the present embodiment, it is assumed that the number of images downloaded in this step does not arrive at the number of pages of the album.

In Step S13003, in order to supplement the number of insufficient images, the kiosk terminal 1004 adds images from stock photos. Here, the stock photos are a supplement image data group stored in the kiosk terminal 1004 for supplementing the number of insufficient images.

For example, in a case where a photo album having both left and right ten pages in which at least one image is necessary for both left and right faces is generated, ten images of the park visitor 1009 are necessary. Accordingly, in a case where only one image of the park visitor 1009 is present, it is necessary to add nine pieces of supplement image data from the stock photos. On the other hand, in a case where only seven images of the park visitor 1009 are present, it is necessary to add three pieces of supplement image data from the stock photos.

FIG. 14 illustrates the data structure for the stock photos. FIG. 14 illustrates a state in which nine images are stored as the stock photos. Each of the stock photos includes a use order ("addition order"), "addition place information" representing "a place at which the stock photo is added in the image data group of the park visitor", and a location ID.

Here, the process of adding images selected from the stock photos will be described in detail. The images selected from the stock photos are selected in accordance with "addition order".

First, in Step S13002, the kiosk terminal 1004 sorts the downloaded image data group in accordance with the photographing date and time inside the park to be rearranged in a time series. Next, in a case where image data from the stock photos is added to the beginning in accordance with "addition place information" described above, the kiosk terminal 1004 sets time that is a predetermined time, for example, one hour before the photographing date and time of the first image data that has been sorted as a photographing date and time of the image. In addition, in a case where image data from the stock photos is added to the end in accordance with "addition place information" described above, the kiosk terminal 1004 sets time that is a predetermined time, for example, one hour after the photographing date and time of the last image data that has been sorted as a photographing date and time of the image. In addition, in a case where image data from the stock photos is added in the middle of the sorted image data group in accordance with "adding place information" described above, the kiosk terminal 1004 sets a time between the photographing dates and times of the image data before and after the addition as a photographing date and time of the image. For example, the kiosk terminal 1004 sets average time of the photographing times of the image data before and after the addition as a photographing date and time of the image.

In Step S13004, the kiosk terminal 1004, first, performs rearrangement, an analysis, and scoring of the image data group including the images added in Step S13003. In Step S13004, the kiosk terminal 1004, first, rearranges the image data group in a time series by sorting the image data group in accordance with the photographing date and time inside the park. Thereafter, the kiosk terminal 1004 performs scoring by analyzing images. The image data group includes the stock photos, and photographing time according to the addition information is set as a photographing date and time in each of the stock photos, and accordingly, even when a sorting process is performed for the image data group, the image data group including the stock photos can be correctly rearranged. The scoring process is the same as the process of Step S5003 according to Embodiment 1, and thus, the description thereof will not be presented here.

In Step S13005, the kiosk terminal 1004 divides the image data group including the images added in Step S13003 into pages based on the photographing date and time. The process of this step is the same as the process of Step S5004 according to Embodiment 1, and thus, the description thereof will not be presented here.

In addition, until this step, the process is for all the image data group including the added image data, and from the next step, the process is for each page.

In Step S13006, the kiosk terminal 1004 selects one temporary template for a page that is a processing target from a temporary template group illustrated in FIGS. 7 and 8. The process of this step is the same as the process of Step S5005 according to Embodiment 1, and thus, the description thereof will not be presented here.

In Step S13007, the kiosk terminal 1004 acquires a location ID of each image in the temporary template selected in Step S13006. In a case where the stock photos are used, the number of images is small, and one piece of image data is laid out on one page of left and right two faces. For this reason, the location ID of one piece of image data becomes the location ID of the page. In addition, since each stock photo includes a location ID, even when stock photos are added to the inside of the page, the image data group including the stock photos can be correctly laid out.

In Step S13008, the kiosk terminal 1004 acquires a photographing period of images of the temporary template selected in Step S13006. In other words, an oldest photographing date and a latest photographing date in the image group are acquired, and a period from the oldest photographing date to the latest photographing date is set as a photographing period. In the present embodiment, the photographing date of one piece of image data becomes a photographing period.

In Step S13009, the kiosk terminal 1004 selects a template design group based on the template ID of the temporary template acquired in Step S13006. FIG. 15 illustrates a database of a template design group of a case where stock photos are used. Template designs 9001 to 9003 are template designs used for image data other than that of the stock photos. As can be known from the location IDs, template designs 9004 to 9007 are template designs used for the stock photos.

In Step S13010, the kiosk terminal 1004 selects a template matching the location ID acquired in Step S13007 from the template design group selected in Step S13009. In addition, for a unique location ID included in each stock photo, a unique template is selected. In the unique template, for example, instead of laying out images, a map of the inside of the park or trivia information relating to the inside of the park may be laid out.

In Step S13011, the kiosk terminal 1004 selects a template design group matching the photographing period acquired in Step S13008 from the template group selected in Step S13010.

In Step S13012, the kiosk terminal 1004 selects one template design from among the template design group selected in Step S13011. The process of this step is the same as the process of Step S5011 according to Embodiment 1, and thus, the description thereof will not be presented here.

In Step S13013, the kiosk terminal 1004 draws an album page based on the image data of the temporary template selected in Step S13006 and the template design selected in Step S13012. In this drawing process, in a column of a drawing order illustrated in FIG. 15, designation of whether the image data is drawn after drawing the template design or the template design is drawn after drawing the image data is defined.

Generally, after the template design is drawn, an image is drawn. In addition, in a case where a design other than a rectangle such as a design in which a part of a character overlaps the image is used, the position of the image of the template design may be designated to be in a transparent color. In such a case, the image is drawn first, and then the template design in which the designation of the transparent color is present is drawn from the upper side, whereby a design other than a rectangle can be represented.

In addition, since the stock photo includes information for drawing, designation for drawing from the upper side can be performed without necessarily applying a transparent color to the template design associated with the stock photo. By doing as such, the stock photo is hidden, and only a map of the inside of the park or trivia information relating to the inside of the park may be laid out.

In Step S13014, the kiosk terminal 1004 determines whether or not the process of all the pages has been completed. In a case where the process of all the pages has not been completed, the process is returned to Step S13006, and the next page is processed. On the other hand, in a case where the process has been completed, the process ends. In other words, by repeating Step S13006 to Step S13013 in correspondence with the number of pages, the album data corresponding to all the pages can be generated.

As described above, according to the present embodiment, even in a case where the number of images photographed inside the park is insufficient, by separately generating a special page, similar to Embodiment 1, an album can be generated by assigning a template design according to the photographing place of the image.

As described above, according to the present embodiment, an album can be generated by assigning a template design according to the photographing place or the photographing period of the image data by using a location ID associated with the image data and the photographing period of the image data. In addition, in a case where the number of images photographed inside the park is insufficient, by adding the supplement image data, a separate special page design can be assigned. Furthermore, the present embodiment, similar to Embodiment 2 can be also applied to a case where a temporary template is not used.

Embodiment 4

In Embodiment 1, a template design is selected without considering the order of the template design. Meanwhile, a template design including a welcome message such as "Welcome!" is desired to be selected for the first page of an album, and a template design including a message such as "See you again!" is desired to be selected for the last page. Thus, in the present embodiment, a case will be described in which a unique template design is selected for each page. The configurations of the inside-park photographing system and the kiosk terminal are the same as those of Embodiment 1, and thus, the description thereof will not be presented here.

Figure 16:
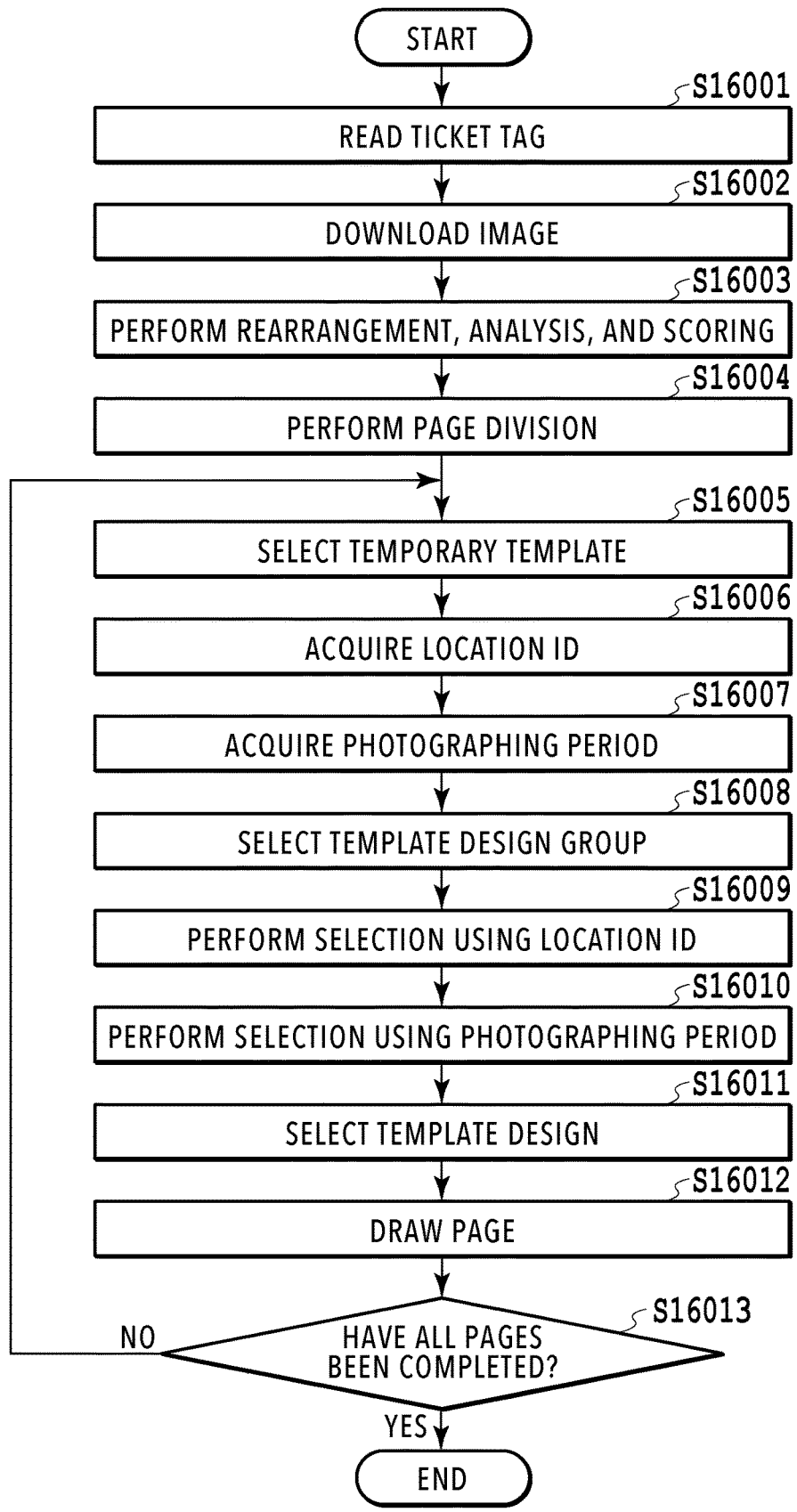
FIG. 16 is a flowchart of a photo album generating process according to Embodiment 4.

FIG. 16 illustrates a flowchart for generating album data using the kiosk terminal 1004.

In Step S16001, the park visitor 1009 allows the kiosk terminal 1004 to read a ticket tag 1010. The kiosk terminal 1004 reads a ticket tag ID recorded in the ticket tag 1010 by using a ticket tag reader.

In Step S16002, the kiosk terminal 1004 inquires of the image database server 1001 about image data and a location ID based on the ticket tag ID read in Step S16001. In a case where image data and a location ID associated with the ticket tag ID are present, the kiosk terminal 1004 downloads the image data and the location ID through an inside-park network 1000 and stores them in a storage device 4008 provided inside the kiosk terminal 1004. For example, in a case where the ticket tag ID is "0000-0001-0001-0001", the kiosk terminal 1004 can acquire the photographing date and time, the location ID, and the image data of each of ID 000 to ID 010 from an image database illustrated in FIG. 3.

In addition, in a case where the park visitor 1009 visits the park together with his family member or the like, the kiosk terminal 1004 may be caused to read a plurality of ticket tag IDs, and the above-described data associated with each ticket tag ID may be downloaded. In such a case, the process of Step S16001 and Step S16002 is repeated.

In Step S16003, the kiosk terminal 1004 performs rearrangement, an analysis, and scoring of the image data group downloaded in Step S16002. In this step, the kiosk terminal 1004, first, rearranges the images in a time series by sorting the image data group in accordance with the photographing date and time inside the park. Thereafter, the kiosk terminal 1004 performs scoring by analyzing images. The scoring process is the same as the process of Step S5003 according to Embodiment 1, and thus, the description thereof will not be presented here.

In Step S16004, the kiosk terminal 1004 divides the image data group downloaded in Step S16002 into pages based on the photographing date and time. The process of this step is the same as the process of Step S5004 according to Embodiment 1, and thus, the description thereof will not be presented here.

In addition, until this step, the process is for all the downloaded image data group, and from the next step, the process is for each page.

In Step S16005, the kiosk terminal 1004 selects one temporary template for a page that is a processing target from a temporary template group illustrated in FIGS. 7 and 8. The process of this step is the same as the process of Step S5005 according to Embodiment 1, and thus, the description thereof will not be presented here.

In Step S16006, the kiosk terminal 1004 acquires a location ID of each image in the temporary template selected in Step S16005. The process of this step is the same as the process of Step S5006 according to Embodiment 1, and thus, the description thereof will not be presented here.

In Step S16007, the kiosk terminal 1004 acquires a photographing period of images of the temporary template selected in Step S16005. In other words, an oldest photographing date and a latest photographing date in the image group are acquired, and a period from the oldest photographing date to the latest photographing date is set as a photographing period.

In Step S16008, the kiosk terminal 1004 selects a template design group based on the template ID of the temporary template acquired in Step S16005 and the page number. FIG. 17 illustrates a database of a template design group. A template design of a template ID: 17001 has a page number "1" and is a template design of which the location ID corresponds to "Entrance". A template design of a template ID: 17002 has a page number "10" (last number) and is a template design of which the location ID corresponds to "Entrance". The other templates are the same as the templates according to Embodiment 1 illustrated in FIG. 11. In a case where a page that is a processing target is a first page, the template design of the template ID: 17001 is selected. Similarly, in a case where a page that is a processing target is a 10th page, the template design of the template ID: 17002 is selected. In addition, similar to Embodiment 1, in a case where a page that is a processing target is one of a second page to a ninth page, there is no template design in which a page is designated, and accordingly, a template of each of a template ID: 17003 and subsequent template IDs is selected.

In Step S16009, the kiosk terminal 1004 selects a template matching the location ID acquired in Step S16006 from the template design group selected in Step S16008. The process of this step is the same as the process of Step S5009 according to Embodiment 1, and thus, the description thereof will not be presented here.

In Step S16010, the kiosk terminal 1004 selects a template design group matching the photographing period acquired in Step S16007 from the template group selected in Step S16009.

In Step S16011, the kiosk terminal 1004 selects one template design from among the template design group selected in Step S16010. The process of this step is the same as the process of Step S5011 according to Embodiment 1, and thus, the description thereof will not be presented here.

In Step S16012, the kiosk terminal 1004 draws an album page based on the image data of the temporary template selected in Step S16005 and the template design selected in Step S16011. The process of this step is the same as the process of Step S5012 according to Embodiment 1, and thus, the description thereof will not be presented here.

In Step S16013, the kiosk terminal 1004 determines whether or not the process of all the pages has been completed. In a case where the process of all the pages has not been completed, the process is returned to Step S16005, and the next page is processed. On the other hand, in a case where the process has been completed, the process ends. In other words, by repeating Step S16005 to Step S16012 in correspondence with the number of pages, the album data corresponding to all the pages can be generated.

As described above, according to the present embodiment, an album can be generated by assigning a template design according to the photographing place or the photographing period of the image data by using a location ID associated with the image data and the photographing period of the image data. In addition, a designated template design can be assigned to a specific page. Furthermore, the present embodiment, similar to Embodiment 2, can be applied also to a case where a temporary template is not used.

In this way, according to the present invention, a photographing place or period is set for a template design in advance, a photographing place and a photographing date are recorded at the time of performing photographing, and, when a template design is selected, a template design relating to the selected photo data can be selected. For this reason, in a case where photo data photographed in a specific attraction or theme area is laid out, a template design that is appropriate for the attraction or the theme area can be selected. In addition, since a template design can be selected based on the photographing period, a template design matching the period of a specific event (for example, Easter, Christmas, or the like) can be selected. More specifically, by preparing a special template design, for photo data photographed in the period of a specific event, a photo album of special event specifications can be generated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a photo album can be generated by automatically selecting a template with a design corresponding to a photographing place or a photographing period of image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-015670, filed Jan. 31, 2017, which is hereby incorporated by reference wherein in its entirety.

What is claimed is:

1. An information processing method executed by an information processing apparatus that generates layout data by assigning image data to a template, the method comprising the steps of:
inputting the image data;
assigning the input image data to a temporary template;
obtaining at least one of photographing place information and photographing period information from the image data;
automatically selecting, without receiving a user's selection, a template having a design corresponding to the obtained at least one of the photographing place information and the photographing period information from a template group which is stored in the information processing apparatus and corresponds to the temporary template to which the image data is assigned; and
outputting the layout data generated by assigning the image data to the selected template.

2. The information processing method according to claim 1, wherein the photographing place information is set in the image data by a photographer.

3. The information processing method according to claim 1, wherein the photographing place information is set in the image data by using a Global Positioning System.

4. The information processing method according to claim 1, further comprising the step of:
adding supplement image data for generating the layout data in a case where the number of pieces of the input image data does not arrive at the number of pages of a photo album generated from a photo album data includes a plurality of pieces of the layout data.

5. The information processing method according to claim 4, wherein the layout data corresponding to the supplement image data is generated by assigning the supplement image data to a template corresponding to the supplement image data.

6. The information processing method according to claim 1,
wherein the stored template group includes templates corresponding to a page number of a photo album generated from a plurality of pieces of the layout data, and the selecting of a template includes selecting a template corresponding to the page number.

7. The information processing method according to claim 1, further comprising the step of:
generating photo album data by using a plurality of pieces of the generated layout data, and wherein a photo album is generated based on the photo album data by a printer.

8. The information processing method according to claim 1, further comprising the step of:
reading an ID corresponding to the user; and
wherein the input image data is the image data corresponding to the read ID.

9. The information processing method according to claim 1, wherein in a case where a plurality of pieces of the image data are assigned to one template, and a plurality of pieces of the photographing place information obtained from a plurality of pieces of the image data are different, a template having a design corresponding to the plurality of pieces of different photographing place information are selected.

10. The information processing method according to claim 1,
wherein a plurality of pieces of the layout data are generated by assigning the image data to a plurality of templates, and
in a case where the obtained template group includes a plurality of templates having the design corresponding to the obtained at least one of the photographing place information and the photographing period information, the image data is assigned to a template which is not used for the already generated layout data in the plurality of templates having the design corresponding to the obtained at least one of the photographing place information and the photographing period information.

11. The information processing method according to claim 1, further comprising the step of:
scoring the input image data; and
wherein the input image data is assigned to the temporary template based on a score of the input image data obtained by the scoring.

12. An information processing method executed by an information processing apparatus that generates layout data by assigning image data to a template, the method comprising the steps of:
inputting the image data;
adding supplement image data for generating the layout data in a case where the number of pieces of the input image data does not arrive at the number of pages of a photo album generated from a photo album data includes a plurality of pieces of the layout data;
obtaining at least one of photographing place information and photographing period information from the image data;
automatically selecting, without receiving a user's selection, a template having a design corresponding to the obtained at least one of the photographing place information and the photographing period information from a template group which is stored in the information processing apparatus; and
outputting the photo album data by using a plurality of pieces of the layout data,
wherein, in a case where the number of pieces of the input image data does not arrive at the number of pages of the photo album, the photo album data is output by using a plurality of pieces of the layout data including the layout data generated by assigning the input image data to the selected template and the layout data generated by assigning the supplement image data to a template in the template group.

13. The information processing method according to claim 12, wherein the photographing place information is set in the image data by a photographer.

14. The information processing method according to claim 12, wherein the photographing place information is set in the image data by using a Global Positioning System.

15. The information processing method according to claim 12, wherein the layout data corresponding to the supplement image data is generated by assigning the supplement image data to a template corresponding to the supplement image data.

16. The information processing method according to claim 12,
wherein the stored template group includes templates corresponding to the page number of the photo album, and
the selecting of a template includes selecting a template corresponding to the page number.

17. The information processing method according to claim 12, further comprising the step of:
reading an ID corresponding to the user; and
wherein the input image data is the image data corresponding to the read ID.

18. The information processing method according to claim 12, wherein in a case where a plurality of pieces of the image data are assigned to one template, and a plurality of pieces of the photographing place information obtained from a plurality of pieces of the image data are different, a template having a design corresponding to the plurality of pieces of different photographing place information are selected.

19. The information processing method according to claim 12,
wherein a plurality of pieces of the layout data are generated by assigning the image data to a plurality of templates, and
in a case where the obtained template group includes a plurality of templates having the design corresponding to the obtained at least one of the photographing place information and the photographing period information, the image data is assigned to a template which is not used for the already generated layout data in the plurality of templates having the design corresponding to the obtained at least one of the photographing place information and the photographing period information.

20. The information processing method according to claim 12, further comprising the step of:
scoring the input data; and
wherein the input image data is assigned to the temporary template based on a score of the input image data obtained by the scoring.

* * * * *